United States Patent [19]
Firth

[11] 3,738,691
[45] June 12, 1973

[54] SPLIT CONTRACTIBLE BUSHING

[76] Inventor: David Firth, 1441 E. Jefferson Boulevard, South Bend, Ind. 146617

[22] Filed: Sept. 22, 1971

[21] Appl. No.: 182,579

[52] U.S. Cl. ............................................. 287/52.06
[51] Int. Cl. ............................................. F16d 1/06
[58] Field of Search............... 287/52.06, 116, 52.04

[56] References Cited
UNITED STATES PATENTS

| 2,524,027 | 10/1950 | Blackmarr | 287/52.06 |
| 1,328,612 | 1/1920 | Becker | 287/116 |
| 2,710,762 | 6/1955 | Whitaker | 287/52.06 |
| 3,139,296 | 6/1964 | Greene | 287/52 R |
| 2,269,821 | 1/1942 | Kemphert et al. | 74/230.01 |
| 2,402,743 | 6/1946 | Firth | 287/52 R |

Primary Examiner—Andrew V. Kundrat
Attorney—James D. Hall and Oltsch & Knoblock

[57] ABSTRACT

A bushing comprising part of a shaft-mountable unit which is adapted to be fitted within a hub having a tapered bore. The bushing includes a shank having a flange at one end thereof. A longitudinal slot is formed within that shank and extends from adjacent the flange to the opposite end of the shank. A transverse, part-circumferential slot is formed in the shank adjacent the flange in communication with the longitudinal slot.

3 Claims, 7 Drawing Figures

INVENTOR.
DAVID FIRTH

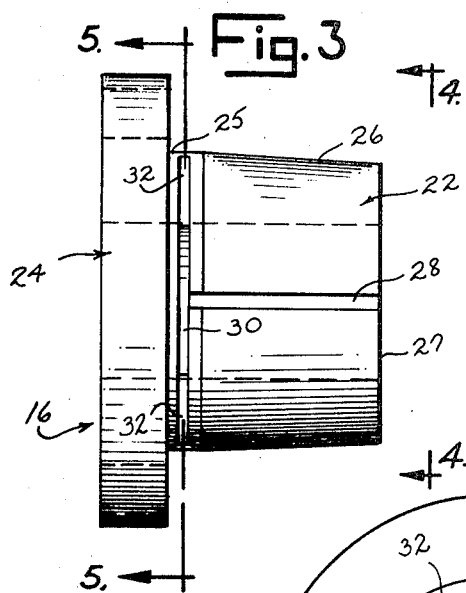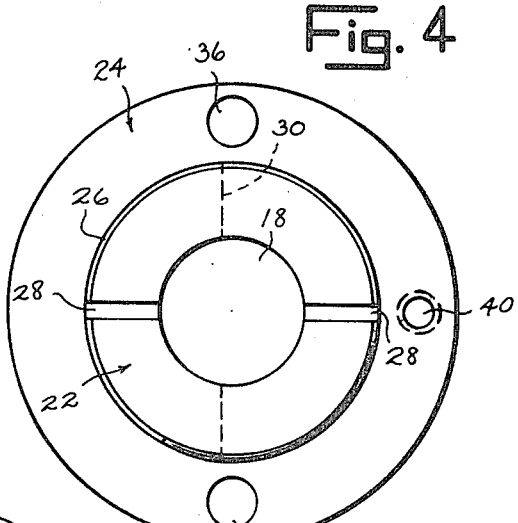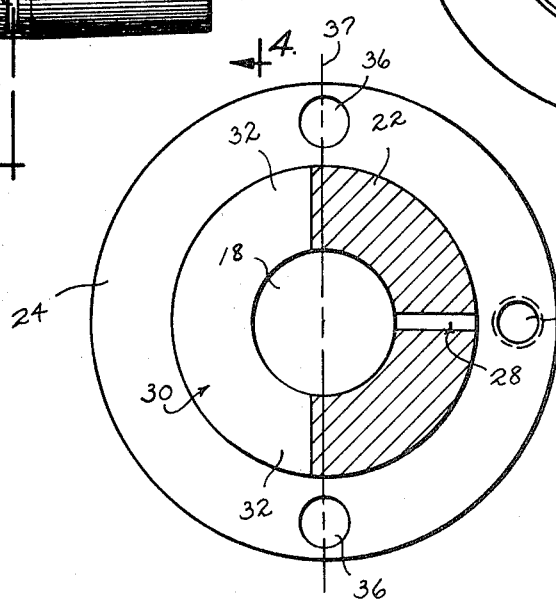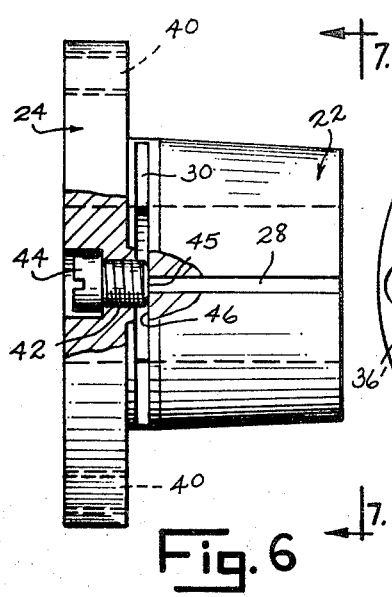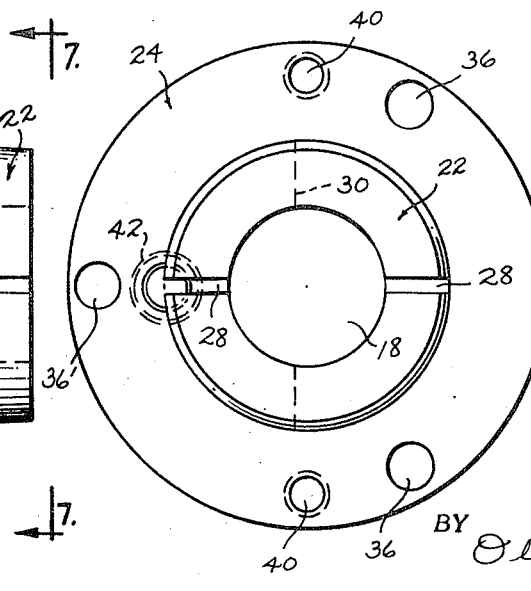

SPLIT CONTRACTIBLE BUSHING

SUMMARY OF THE INVENTION

This invention pertains to a shaft-mountable unit which includes a hub having an interfitting split contractible bushing enclosing a shaft and will have specific application to an improved split contractible bushing.

The bushing of this invention includes a shank having a flange part at one end thereof. The bushing fits within the tapered bore of a hub constituting a component of a shaft-mountable unit. The bushing has a uniform shaft bore which extends through the shank and flange part. The shank has a longitudinal slot formed therein which extends from adjacent the flange part at one end of the shank to the opposite end of the shank. A transverse, part-circumferential slot is formed in the shank and communicates with the longitudinal slot therein. The transverse slot in the bushing permits the slotted portions of the shank when urged into the hub to fully grip the shaft extending through the bushing.

Accordingly, it is an object of this invention to provide a shaft-mountable unit which includes a hub and an improved split contractible bushing which is fitted within said hub bore and which is utilized to secure a shaft to the hub.

Another object of this invention is to provide a shaft-mountable unit including a hub having a tapered bore and a bushing having a tapered shank which includes communicating longitudinal and transverse part-circumferential slots formed therein.

Another object of this invention is to provide a split contractible tapered bushing utilized to connect a hub and shaft in which the bushing has a transverse part-circumferential slot formed therein which enables the bushing to fully grip the shaft when urged into the hub.

Other objects of this invention will become apparent upon a reading of the invention's description.

BRIEF DESCRIPTION OF THE DRAWINGS

FIG. 3 is a side view of the bushing utilized in the shaft-mountable unit of FIG. 1.

FIG. 4 is an end view of the bushing as seen from line 4—4 of FIG. 3.

FIG. 5 is a sectional view taken along 5—5 of FIG. 3.

FIG. 6 is the bushing of FIG. 3 shown in modified form.

FIG. 7 is an end view of the bushing of FIG. 6 as seen from line 7—7 of FIG. 6.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
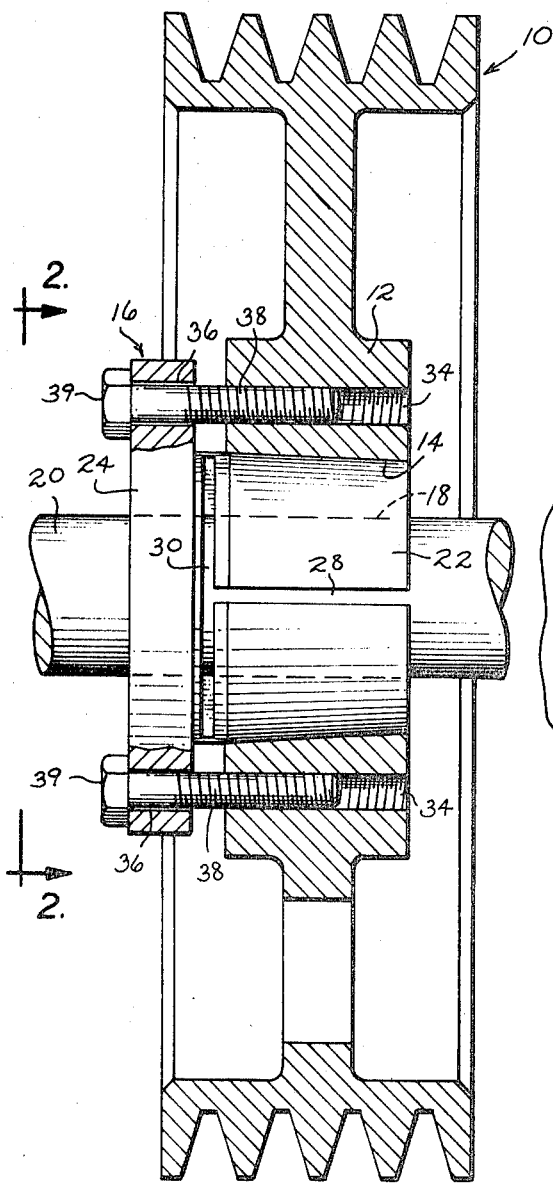
FIG. 1 is a sectional view of one embodiment of the shaft-mountable unit of this invention.
Figure 2:
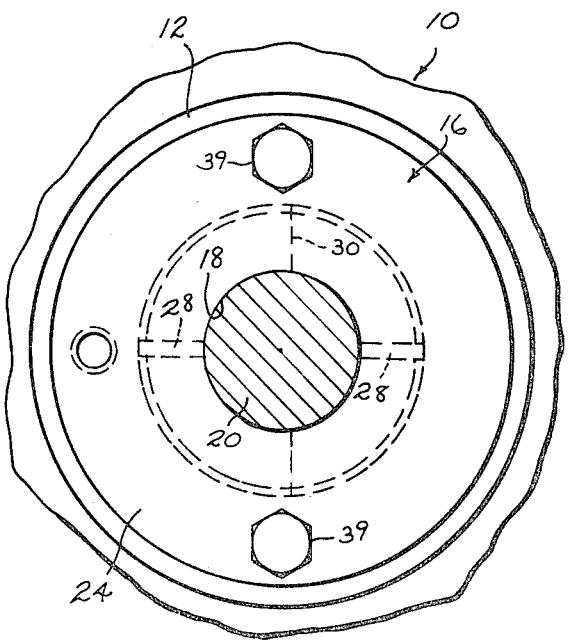
FIG. 2 is a fragmentary end view of the shaft-mountable unit of FIG. 1 as seen from line 2—2 of FIG. 1.

Referring to the embodiment shown in FIGS. 1-5, reference numeral 10 refers to a sheave which includes a hub 12 having a tapered bore 14 therethrough. A bushing 16 is fitted within bore 14 of sheave 10 and has an axial bore 18 which receives a shaft 20. It is to be understood that hub 12 may constitute a part of any type of rotative drive, such as a wheel, sprocket, or coupling, as well as a sheave.

Bushing 16 includes a shank 22 and an integral flange part 24. Shank 22 includes an inner surface which defines axial bore 18 and an outer surface 26. Flange part 24 is located at one end 25 of shank 22 with outer surface 26 thereof preferably tapering toward the opposite end 27 of the shank. At least one and preferably two longitudinal slots 28 are formed in shank 22. Slots 28 are preferably diametrically spaced apart in shank 22 and extend from the inner surface to the outer surface 26 of shank 22 and from shank end 27 to adjacent flange part 24. A transverse part-circumferential slot 30 is formed in shank 22 adjacent flange part 24. Slot 30 intersects or communicates with one of the longitudinal slots 28 and extends from the inner surface to the outer surface 26 of the shank. Transverse slot 30 includes end portions 32 which extend outwardly from opposite sides of intersected longitudinal slot 28, preferably for substantially equal circumferential distances.

Hub 12 is provided with a pair of diametrically spaced threaded bores or holes 34. Flange part 24 of bushing 16 is provided with a pair of unthreaded bores 36 which are preferably equi-angularly spaced from longitudinal slots 28 and which are located so as to be aligned with holes 34 in hub 12 when shank 22 of the bushing is inserted into bore 14 of the hub. A headed tightening screw 38 is threaded into each bore 34 in the hub with the head 39 thereof abutting the outer surface of flange part 24 of bushing 16 so that as the bolt is turned into hub 12 the shank 22 of the bushing will be urged into bore 14 of the hub, thereby causing the shank to grip the shaft 20 which extends through bushing bore 18. Transverse slot 30 in bushing 16 allows the slotted portions of shank 22 to fully grip shaft 20 as screws 38 are tightened against flange 24.

As best seen in FIG. 5, end portions 32 of transverse slot 30 in the bushing preferably do not extend to the diametrical center line 37 of shank 22 which passes through the centers of holes 36 in bushing flange part 24. Thus holes 36 are located adjacent solid wall parts of the shank, thereby strengthening the flange part around the holes to prevent bending of the flange part when screws 38 are tightened to urge the bushing into hub 12. A threaded jackscrew bore 40 is provided in flange part 24 of the bushing. Bore 40 is positioned at the opposite side of the bushing from transverse slot 30 and is utilized to receive a screw 38 which when threaded through bore 40 will abut hub 12 and serve to dislodge or free the bushing from the hub to release shaft 20.

In FIGS. 6 and 7, bushing 16 is modified to the extent that three equi-angularly spaced unthreaded bores or holes 36 are provided in flange part 24 for the purpose of receiving tightening screws 38 turned into registering threaded bores in a hub. The size of bushing 16 determines how many holes 36 and tightening screws 38 are required to urge the bushing into the bore of the hub and into gripping contact with the shaft received therein. Because of the number of and angular relationship between holes 36, one hole 36' of the three holes will be located in that section of flange part 24 which extends circumferentially of transverse slot 30 in the shank. To prevent flexure of flange part 24 along transverse slot 30 during tightening of screws 38, a threaded bore 42, preferably countersunk, is formed in flange part 24 over slot 30 and in radial alignment with hole 36'. An abutment screw 44 is threaded into bore 42 with the end 45 thereof extending into transverse slot 30 and abutting shank 22 at wall surface 46 of slot 30. End 45 of abutment screw 44 is preferably flat and in abutting shank 22 provides for solid support between the bushing flange part and shank. Should bore 42 be located over a longitudinal slot 28 in shank 22, as shown in FIGS. 6 and 7, the flat end 45 of the screw will permit constrictive movement of the slotted portions of shank 22 to grip the shaft inserted through its bore 18 as the bushing is urged into a hub. Flange part 24 of the bushing 16 in FIGS. 6 and 7 also has two diametrically spaced threaded jackscrew bores 40 which are utilized to free the bushing from the hub once the tightening screws extending through holes 36 have been loosened or removed. Transverse slot 30 in the bushing preferably does not extend quite half-way through the shank and is spaced from the diametrical center line of the bushing which passes through the centers of jackscrew bores 40.

It is to be understood that the invention is not to be limited to the details herein given but may be modified within the scope of the appended claims.

What I claim is:

1. In a shaft-mountable unit including a hub having a tapered bore, a bushing including a shank having first and second ends and a flange part at said first shank end, said bushing having a shaft bore extending through said shank and flange part, said shank including an outer surface tapered from said first to said second shank ends and an inner surface defining said shaft bore, the improvement wherein said shank has a longitudinal slot and a transverse part-circumferential slot each extending through said shank from said outer to said inner shank surfaces, said longitudinal slot extending from said second shank end to adjacent said flange part, said transverse slot communicating with said longitudinal slot adjacent said flange part, said shank fitting within said tapered bore, means for urging said shank into said tapered bore whereby that portion of said shank between said transverse slot and said second shank end will be caused to grip a shaft extending through said shaft bore, said flange part having a threaded bore therein, said threaded bore extending to said transverse slot, screw abutment means turned into said threaded bore and abutting said shank at said transverse slot.

2. The shaft-mountable unit of claim 1 wherein said threaded bore extends normally to said transverse slot, said screw abutment means projecting across said transverse slot and contacting the wall of said transverse slot oppositely of said threaded bore.

3. A bushing constituting a part of a shaft-mountable unit which includes a hub having a bore therein comprising a shank having first and second ends and a flange part at said first shank end, said bushing having a shaft bore extending through said shank and flange part, said shank including an outer surface tapered from said first to said second shank ends and having an inner surface defining said shaft bore, said shank having a longitudinal slot and a transverse part-circumferential slot formed therein each extending through said shank from said outer to said inner shank surfaces, said longitudinal slot extending from said second shank end to adjacent said flange part, said transverse slot communicating with said longitudinal slot adjacent said flange part, said shank adapted for a press fit within said hub bore whereby that portion of said shank between said transverse slot and said second shank end will be caused to grip a shaft extending through said shaft bore, said flange having a threaded bore extending to said transverse slot, screw abutment means turned into said threaded bore and having an end portion projecting across said transverse slot and abutting said shank.

* * * * *